(12) United States Patent
Min

(10) Patent No.: US 11,608,022 B2
(45) Date of Patent: Mar. 21, 2023

(54) ROOF AIRBAG FOR VEHICLE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/476,507

(22) Filed: Sep. 16, 2021

(65) Prior Publication Data

US 2023/0007863 A1  Jan. 12, 2023

(30) Foreign Application Priority Data

Jul. 7, 2021  (KR) .................. 10-2021-0089126

(51) Int. Cl.
*B60R 21/214* (2011.01)
*B60R 21/2338* (2011.01)
*B60R 21/233* (2006.01)
*B60R 21/231* (2011.01)

(52) U.S. Cl.
CPC .......... *B60R 21/214* (2013.01); *B60R 21/233* (2013.01); *B60R 21/2338* (2013.01); *B60R 2021/23161* (2013.01); *B60R 2021/23308* (2013.01); *B60R 2021/23386* (2013.01)

(58) Field of Classification Search
CPC . B60R 21/214; B60R 21/233; B60R 21/2338; B60R 2021/23161; B60R 2021/23308; B60R 2021/23386
See application file for complete search history.

(56) References Cited

U.S. PATENT DOCUMENTS

| | | | |
|---|---|---|---|
| 2019/0106073 A1* | 4/2019 | Sundararajan | B60R 21/214 |
| 2019/0161048 A1 | 5/2019 | Thomas | |
| 2019/0203066 A1 | 7/2019 | Onomichi | |
| 2019/0241148 A1* | 8/2019 | Shin | B60R 21/01512 |
| 2019/0375363 A1* | 12/2019 | Abe | B60R 21/233 |
| 2022/0017036 A1* | 1/2022 | Jeong | B60R 21/214 |

FOREIGN PATENT DOCUMENTS

| | | | |
|---|---|---|---|
| DE | 10 2018 116 379 | | 8/2019 |
| KR | 2012-0033743 | | 4/2012 |
| KR | 2019-0093952 | | 8/2019 |
| KR | 2019-0138488 | | 12/2019 |
| KR | 20220063509 A | * | 5/2022 |

OTHER PUBLICATIONS

German Office Action dated Apr. 12, 2022 in German Application No. 10 2021 128 263.2.
Korean Office Action dated Feb. 10, 2023 issued in KR Application No. 10 2021 0089126.
English Language Abstract of KR 2019-0093952 published Aug. 12, 2019.
English Language Abstract of KR 2019-0138488 published Dec. 13, 2019.

* cited by examiner

*Primary Examiner* — Drew J Brown
(74) *Attorney, Agent, or Firm* — DLA Piper LLP (US)

(57) ABSTRACT

A roof airbag apparatus for a vehicle in which an airbag deploys downward from the interior roof and protects occupants seated in seats and the airbag has a bending shape by a tether so that the restraint on occupants is secured and the occupants are safely protected.

10 Claims, 4 Drawing Sheets

ROOF AIRBAG FOR VEHICLE

CROSS REFERENCE TO RELATED APPLICATION

The present application claims priority to Korean Patent Application No. 10-2021-0089126, filed Jul. 7, 2021, the entire contents of which is incorporated herein for all purposes by this reference.

BACKGROUND OF THE INVENTION

Field of the Invention

The present invention relates to a roof airbag apparatus for a vehicle in which an airbag deploys downward from an interior roof and protects occupants seated in the seat.

Description of the Related Art

Vehicles are generally equipped with safety apparatuses to safely protect occupants from accidents such as a collision, a rollover, and the like. Such safety apparatuses include an airbag which, together with a seatbelt restraining the body of an occupant, mitigates an impact from hitting the vehicle body by the occupant. The airbag is installed in various parts of the vehicle as deemed necessary and includes a driver airbag installed on the steering wheel, a front passenger airbag installed on the instrument panel on the passenger side, and the like.

On the other hand, a vehicle is divided into a front space with front seat occupants and a rear space with rear seat occupants. In the event of a vehicle collision, there is a problem that the inertia throws the rear seat occupants to the front, resulting in a collision between the occupants.

In particular, autonomous driving vehicles, which are on the rise recently, are equipped with seats that are configured with 360-degree adjustments. Accordingly, the front seat occupants and the rear seat occupants may be positioned to face each other, and, in the event of a vehicle collision when the front seat occupants and the rear seat occupants face each other, an injury may result from a collision between the occupants.

The matters described above as the related art are intended only for a better understanding of the background of the present invention and should not be taken as an acknowledgment that they pertain to the conventional art already known to those skilled in the related art.

SUMMARY OF THE INVENTION

The present invention is proposed to solve the problems described above and an object of the present invention is to provide a roof airbag apparatus for a vehicle in which an airbag deploys downward from an interior roof and protects occupants seated in the seat and the airbag has a bending shape so that the occupants are safely protected from an impact.

In order to achieve the object, the roof airbag apparatus for a vehicle according to the present invention includes an airbag installed in the interior roof and provided with a plurality of cushions consisting of an upper support portion and a lower support portion, wherein an upper portion of the lower support portion and a lower portion of the upper support portion are connected to each other and the plurality of cushions are configured to bend at a bending point of the upper support portion and the lower support portion; and a tether disposed between a plurality of cushions and connected to the upper support portion and the lower support portion to induce the cushions to bend when the airbag deploys.

The airbag consists of a pair of cushions bending away from each other by the tether at the time of deployment.

Each cushion is provided with a bend-inducing portion formed by an inward depression of the circumference at a bending point of the upper support portion and the lower support portion.

The upper support portion consists of an upper outer cushion portion extending along the circumference and inflating at the time of deployment and an upper dead portion forming an inner surface of the upper outer cushion portion without inflating, and the lower support portion consists of a lower outer cushion portion extending along the circumference and inflating at the time of deployment to be communicatively connected to the upper outer cushion portion and a lower dead portion forming an inner surface of the lower outer cushion portion without inflating.

The cushion is provided with a center cushion portion extending to horizontally cross the bending point of the upper support portion and the lower support portion to be communicatively connected to the upper outer cushion portion and the lower outer cushion portion.

The diameter of a portion of the center cushion portion connected to the upper outer cushion portion and the lower outer cushion portion is smaller than the diameter of the upper outer cushion portion and the lower outer cushion portion.

The lower support portion is provided with a support cushion portion extending from the center cushion portion to vertically cross the lower dead portion to be communicatively connected to the lower outer cushion portion.

The diameter of the bending point of the upper support portion and the lower support portion is smaller than the diameter of the upper outer cushion portion and the lower outer cushion portion in the cushion.

The tether has one end connected to an upper end of the upper support portion and the other end connected to a lower end of the lower support portion and extends shorter than the length of the airbag in the up/down direction.

The tether extends in the width direction of the upper support portion and the lower support portion to have an area covering a part or the whole of the cushion.

The cushion is provided with an auxiliary tether that has one end connected to the upper end of the upper support portion and the other end connected to the bending point of the upper support portion and the lower support portion and that is formed shorter than the length of the tether.

DETAILED DESCRIPTION OF THE INVENTION

A roof airbag apparatus for a vehicle according to a preferred embodiment of the present invention will be described with reference to the accompanying drawings in the following.

Figure 1:
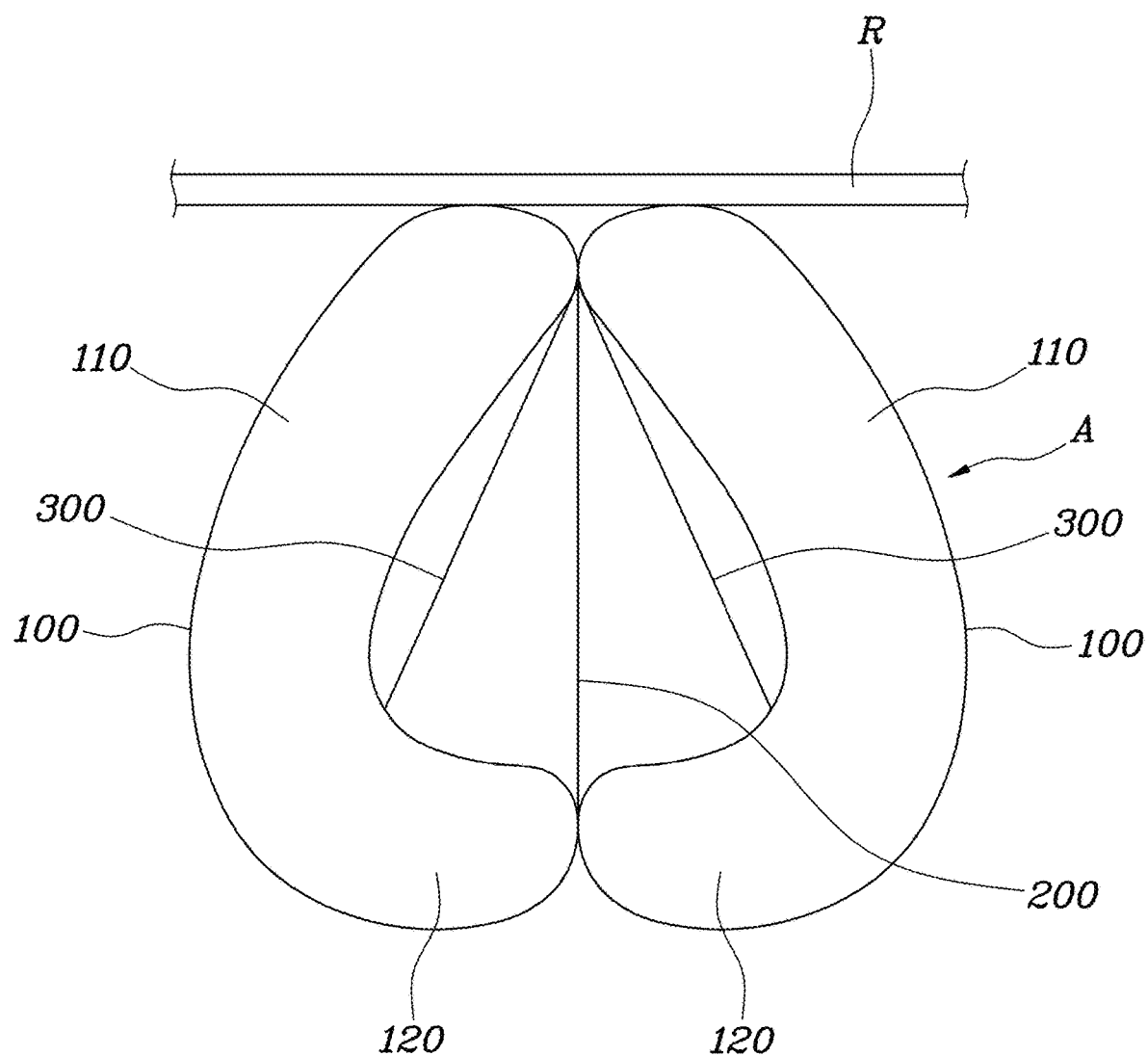
FIG. 1 is a view showing a roof airbag apparatus for a vehicle according to the present invention.
Figure 2:
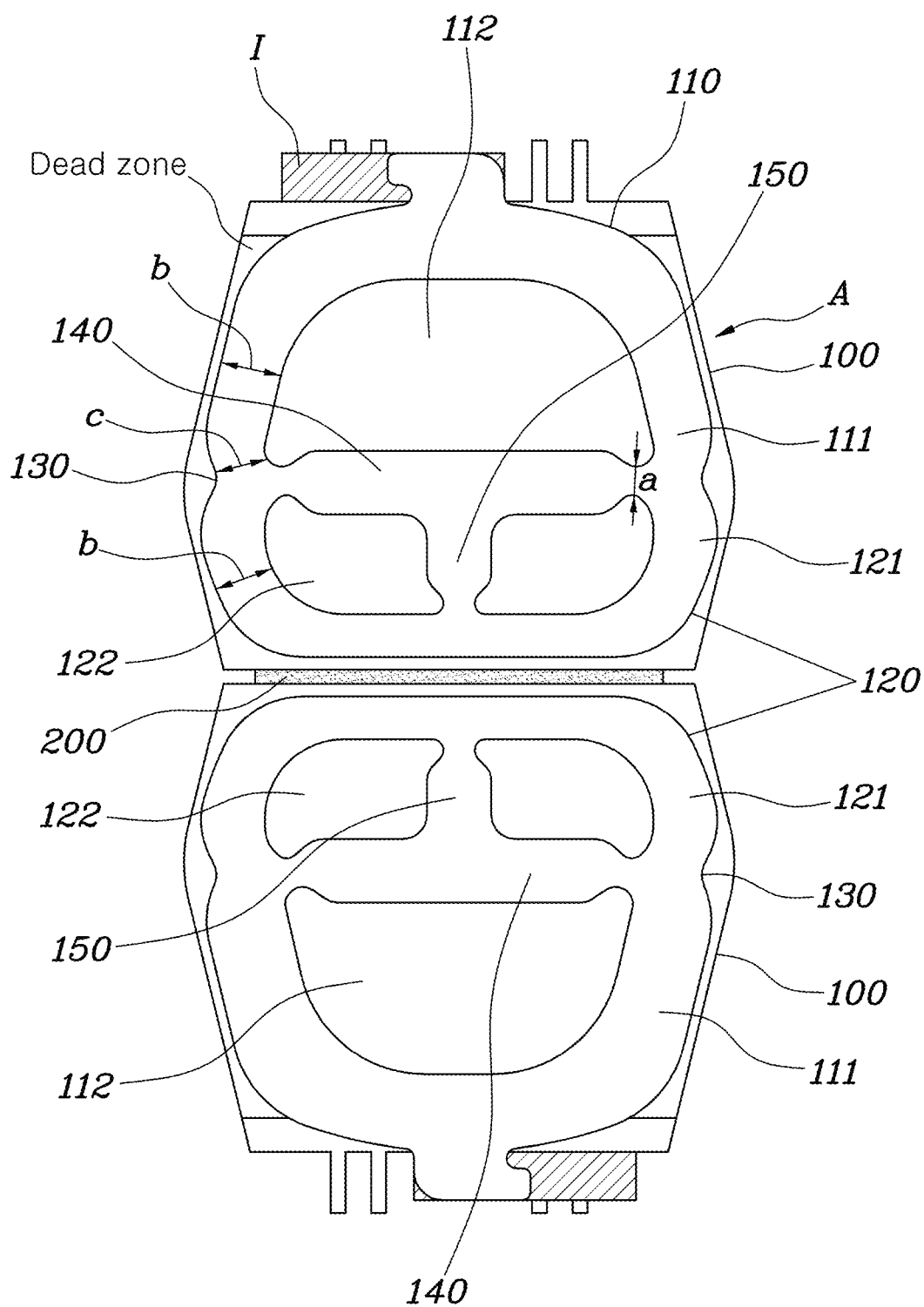
FIG. 2 is a view showing an embodiment of the roof airbag for a vehicle shown in FIG. 1.
Figure 3:
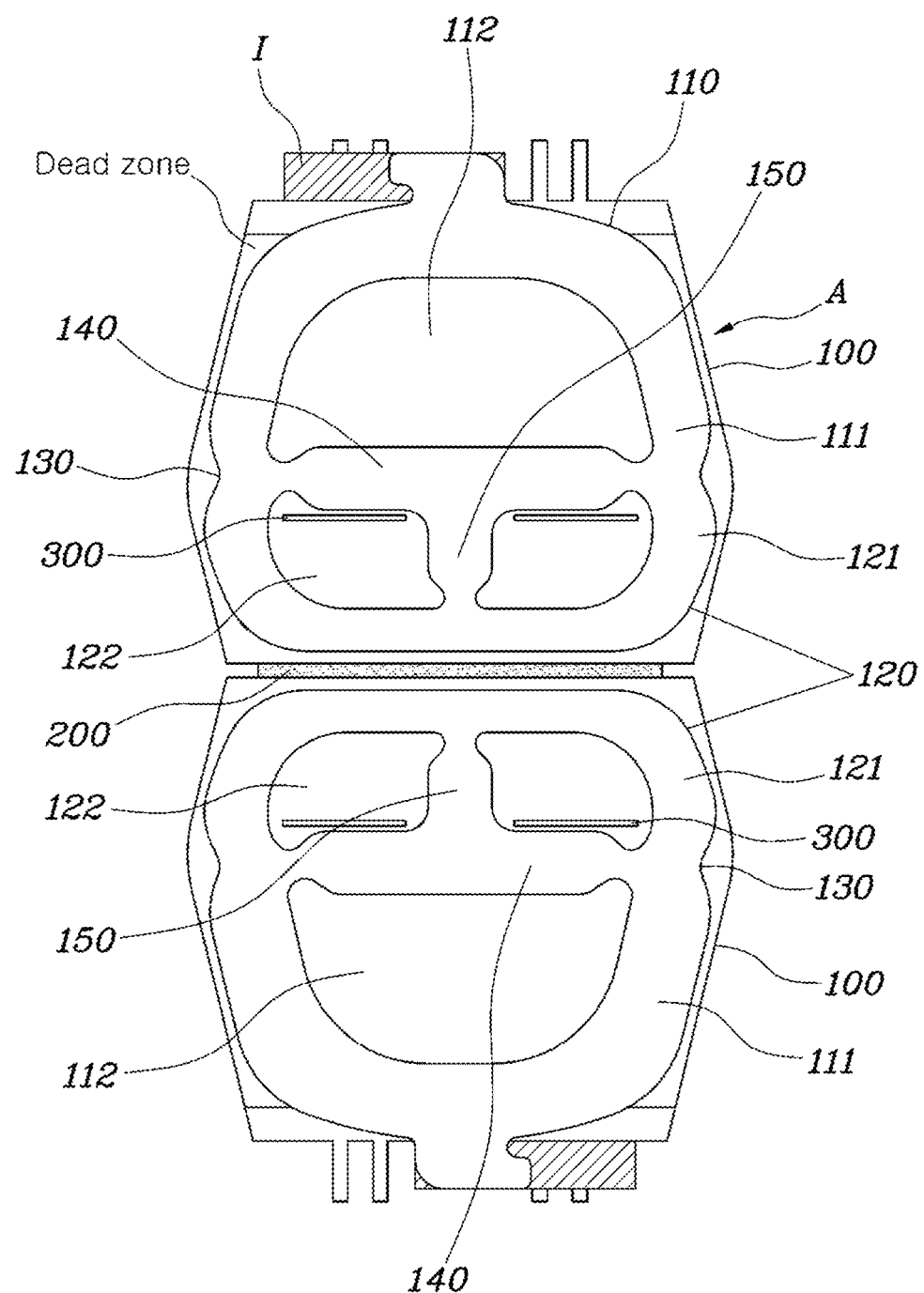
FIG. 3 is a view showing another embodiment of the roof airbag for a vehicle shown in FIG. 1.
Figure 4:
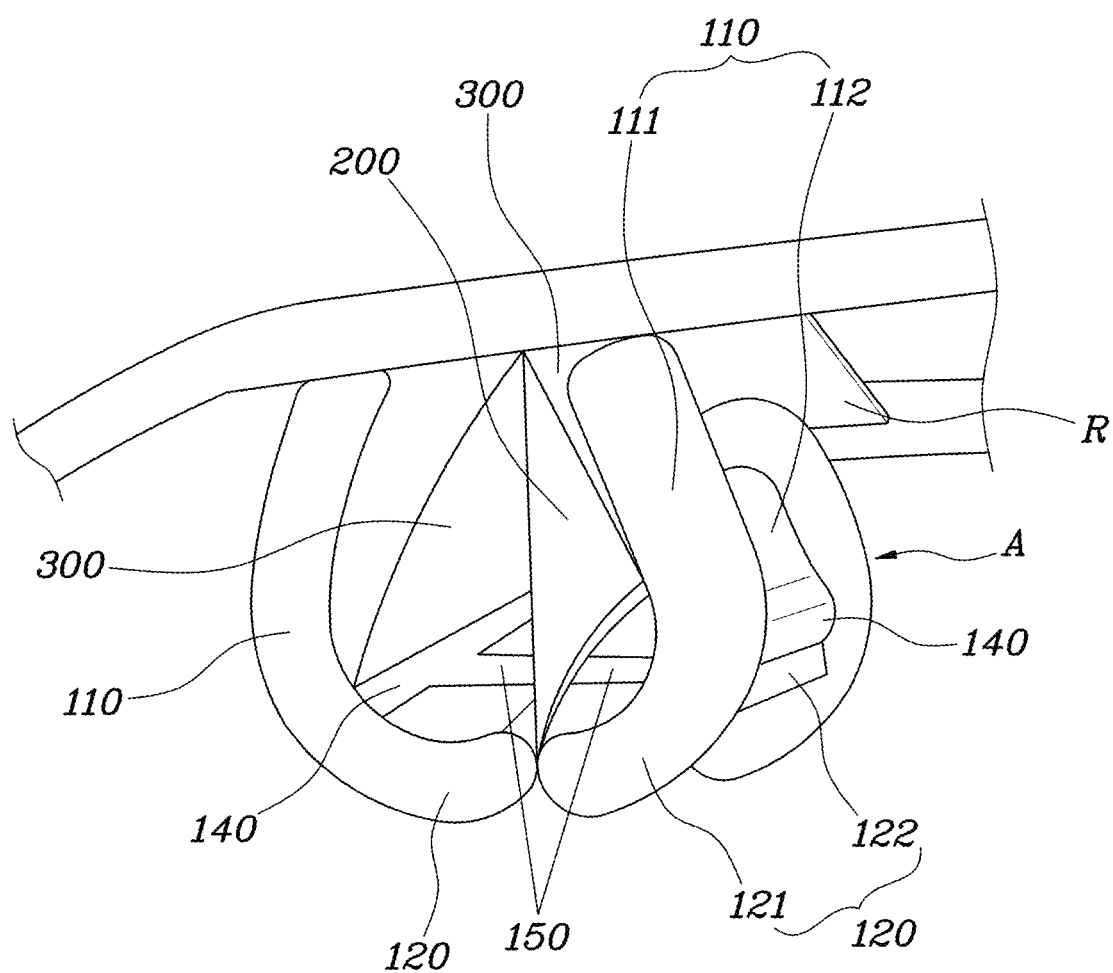
FIG. 4 is a view for describing an airbag deployment of the present invention.

FIG. 1 is a view showing a roof airbag apparatus for a vehicle according to the present invention, FIG. 2 is a view showing an embodiment of the roof airbag apparatus for a vehicle shown in FIG. 1, FIG. 3 is a view showing another embodiment of the roof airbag apparatus for a vehicle shown in FIG. 1, and FIG. 4 is a view for describing an airbag deployment of the present invention.

As shown in FIGS. 1 and 2, the roof airbag apparatus for a vehicle according to the present invention includes an airbag A installed in an interior roof R and provided with a plurality of cushions 100 consisting of an upper support portion 110 and a lower support portion 120, wherein an upper portion of the upper support portion 110 and a lower portion of the lower support portion 120 are connected to each other and the plurality of cushions 100 are configured to bend at a bending point of the upper support portion 110 and the lower support portion 120; and a tether 200 disposed between the plurality of cushions 100 and connected to the upper support portion 110 and the lower support portion 120 to induce the cushion 100 to bend when the airbag A deploys.

Here, the airbag A is installed in the interior roof R and protects an occupant by deploying downward from the roof R upon receiving gas from an inflator I. Accordingly, the airbag A may be disposed between a plurality of seats provided inside at the time of deployment.

As may be seen in FIG. 1, the airbag A of the present invention may consist of a pair of cushions 100, which may be formed to be identical to each other or may be formed to have different shapes or sizes depending on the protection range of the respective cushions 100.

The airbag A consists of a plurality of cushions 100 consisting of the upper support portion 110 and the lower support portion 120, and an upper portion of the upper support portion 110 and a lower portion of the lower support portion 120 are connected to each other so that each cushion 100 may deform when the airbag A deploys.

In addition, an upper end of the upper support portion 110 and a lower end of the lower support portion 120 are connected to each other so that the pair of cushions 100 may deform in order for the upper support portion 110 and the lower support portion 120 to bend except the connecting portion.

To this end, a tether 200 is disposed between respective cushions 100 and is connected to the upper support portion 110 and the lower support portion 120 to induce the airbag to deform.

The tether 200 has one end connected to the upper end of the upper support portion 110 and the other end connected to the lower end of the lower support portion 120 and extends shorter than the length of the airbag A in the up/down direction.

Here, a dead zone portion other than an inflating region is provided when the cushion 100 is manufactured, and the tether 200 is fixedly sewn to the dead zone portions of the upper support portion 110 and the lower support portion 120 so that the cushion 100 avoids damage when the airbag A deploys.

In addition, the tether 200 has one end connected to the upper end of the upper support portion 110 and the other end connected to the lower end of the lower support portion 120 so that the deformable area of the upper support portion 110 and the lower support portion 120 is secured to allow the smooth deformation of respective cushions 100.

In addition, the tether 200 is formed shorter than the length of the airbag A in the up/down direction so that the deployment is limited to the length of the tether 200 when the airbag A deploys and the airbag A consequently deforms in order for the upper support portion 110 and the lower support portion 120 constituting the cushion 100 to bend. That is, the pair of cushions 100 deploy downward at the time of deployment but the deployment of each cushion 100 is limited by the tether 200, and the lower support portion 120 of each cushion 100 is rolled up by the tether 200 to bend so that the airbag A may deploy in various shapes such as an ellipse, a circle, or a polygon. Accordingly, when an occupant comes into contact with each cushion 100 constituting the airbag A, the occupant is protected from an impact and the position of the occupant may be restrained as the occupant is wrapped.

To specifically describe the cushion 100 of the airbag A according to the present invention as described above, each cushion 100 may be provided with a bend-inducing portion 130 formed by an inward depression of the circumference at a bending point of the upper support portion 110 and the lower support portion 120.

As shown in FIG. 2, each cushion 100 is provided with the bend-inducing portion 130 formed along the circumference at the bending point of the upper support portion 110 and the lower support portion 120 so that the cushion 100 may deform in order for the lower support portion 120 to bend from the upper support portion 110 at the bend-inducing portion 130.

Here, the circumference of each cushion 100 is depressed to form the bend-inducing portion 130, at which the cushion 100 deforms in order for the lower support portion 120 to bend so that the upper support portion 110 supports the upper body of the occupant and the lower support portion 120 supports the lower body of the occupant.

On the other hand, the upper support portion 110 consists of an upper outer cushion portion 111 extending along the circumference to inflate at the time of deployment and an upper dead portion 112 forming an inner surface of the upper outer cushion portion 111 without inflating, and the lower support portion 120 consists of a lower outer cushion portion 121 extending along the circumference to inflate at the time of deployment and be communicatively connected to the upper outer cushion portion 111 and a lower dead portion 122 forming an inner surface of the lower outer cushion portion 121 without inflating.

That is, the upper support portion 110 and the lower support portion 120 constituting the cushion 100 are divided into an inflating region and a non-inflating region.

Specifically, as an inflating region of the cushion 100, the upper outer cushion portion 111 of the upper support portion 110 extends along the circumference and the lower outer cushion 121 of the lower support portion 120 extends along the circumference, while the upper outer cushion portion 111 and the lower outer cushion 121 are communicatively connected to each other.

On the other hand, as a non-inflating region of the cushion 100, the upper dead portion 112 is formed inside the upper outer cushion portion 111 in the upper support portion 110 and the lower dead portion 122 is formed inside the lower outer cushion portion 121 in the lower support portion 120.

Accordingly, in the cushion 100, only the portion of the upper support portion 110 and the lower support portion 120 extending along the circumference may inflate to secure the inflating rate of the cushion 100 and maintain the deployment shape of the upper support portion 110 and the lower support portion 120. In addition, the upper dead portion 112 of the upper support portion 110 comes into contact with the upper body of the occupant, and the lower dead portion 122 of the lower support portion 120 comes into contact with the lower body of the occupant so that the upper body and lower body of the occupant may be supported by the cushion 100 to be stably restrained.

Along with this, the cushion 100 may be provided with a center cushion portion 140 extending to horizontally cross the bending point of the upper support portion 110 and the lower support portion 120 to be communicatively connected to the upper outer cushion portion 111 and the lower outer cushion portion 121.

The center cushion portion 140 is the inflating region of the cushion 100 and extends to cross the bending point of the upper support portion 110 and the lower support portion 120 so as to be positioned on the upper body side of the occupant when the occupant is loaded into the cushion 100. Accordingly, when the occupant is loaded into the cushion 100, the center cushion portion 140 may be caught on the head or the upper body of the occupant and safely protect the occupant even if the airbag A is pushed by the occupant to rotate.

In addition, the center cushion portion 140 extends to horizontally cross the cushion 100 so that the deployment shape of the cushion 100 is maintained by the inflating force of the center cushion portion 140.

Here, the diameter a of the portion of the center cushion portion 140 connected to the upper outer cushion portion 111 and the lower outer cushion portion 121 is smaller than the diameter b of the upper outer cushion portion 111 and the lower outer cushion portion 121.

That is, the diameter a of the portion through which gas flows into the center cushion portion 140 is smaller than the diameter b of the upper outer cushion portion 111 and the lower outer cushion portion 121 so that a distributed volume of gas supplied from the inflator I is secured in the upper outer cushion portion 111 and the lower outer cushion portion 121 to secure the deployment speed of the cushion 100. For this reason, when the cushion 100 deploys, the gas is distributed to the upper outer cushion portion 111 and the lower outer cushion portion 121 for the speedy downward deployment from the roof R, and then, a part of the gas is distributed to the center cushion portion 100 having a relatively smaller diameter, so that the deployment shape of the cushion 100 may be maintained and the occupant may be smoothly restrained.

On the other hand, the lower support portion 120 may be provided with a support cushion portion 150 extending from the center cushion portion 140 to vertically cross the lower dead portion 122 to be communicatively connected to the lower outer cushion portion 121.

Here, the support cushion portion 150 is the inflating region, and the shape of the lower support portion 120 may be maintained when the support cushion portion 150 inflates. In addition, when the airbag A deploys, the lower support portion 120 of each cushion 100 bends from the upper support portion 110 in the direction in which the respective cushions 100 face each other, and the support cushion portion 150 formed in the lower support portion 120 forms a supporting force in the direction in which the respective cushions 100 face each other so that the deployment shape of the cushion 100 may be maintained.

On the other hand, the diameter c of the bending point of the upper support portion 110 and the lower support portion 120 may be smaller than the diameter b of the upper outer cushion portion 111 and the lower outer cushion portion 121 in the cushion 100. In this way, in each cushion 100, the diameter c of the bending point of the upper support portion 110 and the lower support portion 120 may be smaller than the diameter b of the upper outer cushion portion 111 and the lower outer cushion portion 121 so that a bending deformation of the lower support portion 120 at the portion having a smaller diameter may be smoothly performed.

The cushion 100 constituting the airbag A deforms in order for the lower support portion 120 to bend from the upper support portion 110 at the time of deployment so that the upper support portion 110 of the cushion 100 supports the upper body of the occupant and the lower support portion 120 supports the lower body of the occupant to stably restrain, and protect from the impact, the occupant.

In addition, the distributed gas volume is secured in the upper outer cushion portion 111 and the lower outer cushion portion 121 of the cushion 100 to improve the early deployment speed and the deployment shape of the cushion 100 is maintained by the center cushion portion 140 and the support cushion portion 150. In addition, the lower support portions 120 of the respective deploying cushions 100 support each other so that the occupant may be stably restrained.

On the other hand, the tether 200 extends in the width direction of the upper support portion 110 and the lower support portion 120 to have an area covering a part or the whole of the cushion 100.

In this way, the tether 200 consists of a surface tether 200 having an area covering the upper support portion 110 or the lower support portion 120 so that the coupling portion to the cushion 100 increases to improve the coupling force to the cushion 100. In addition, the tether 200 extends in the width direction of the upper support portion 110 and the lower support portion 120 so that the cushion 100 may deform exactly into the desired shape by the tether 200 when the cushion 100 constituting the airbag A deploys.

On the other hand, as shown in FIG. 3, the cushion 100 may be provided with an auxiliary tether 300 that has one end connected to the upper end of the upper support portion 110 and the other end connected to the bending point of the upper support portion 110 and the lower support portion 120 and is formed shorter than the length of the tether 200.

In this way, in the cushion 100, the auxiliary tether 300 may be connected to the upper support portion 110 and the lower support portion 120 to guide the deployment shape of the airbag A. That is, each cushion 100 constituting the airbag A deforms to bend due to the limited deployment up to the length of the tether 200 when the cushion 100 deploys and the bending shape is guided by the auxiliary tether 300 so that the bending portion of each cushion 100 may be directed toward the occupant.

In the roof airbag apparatus for a vehicle having a structure as described above, the airbag A deploys downward from the interior roof and protects the occupants seated in the seats and the airbag A has a shape to be bent toward the occupants by the tether 200 so that the restraint on the occupants is secured and the occupants are safely protected.

In the roof airbag apparatus for a vehicle having a structure as described above, the airbag deploys downward from the interior roof and protects the occupants seated in the seats and the airbag has a shape to be bent toward the occupants by the tether so that the restraint on the occupants is secured and the occupants are safely protected.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A roof airbag apparatus for a vehicle comprising:
an airbag installed in an interior roof and provided with a plurality of cushions consisting of an upper support portion and a lower support portion, wherein an upper portion of the upper support portion and a lower portion of the lower support portion are connected to each other and the plurality of cushions are configured to bend at a bending point of the upper support portion and the lower support portion, wherein each cushion is provided with a bend-inducing portion formed by an inward depression of a circumference at a bending point of the upper support portion and the lower support portion; and
a tether installed between the plurality of cushions and connected to the upper support portion and the lower support portion to induce the cushions to bend when the airbag deploys.

2. The roof airbag apparatus for a vehicle of claim 1, wherein the airbag consists of a pair of cushions bending away from each other by the tether at a time of deployment.

3. The roof airbag apparatus for a vehicle of claim 1, wherein the upper support portion consists of an upper outer cushion portion extending along its circumference and inflating at a time of deployment and an upper dead portion forming an inner surface of the upper outer cushion portion without inflating, and the lower support portion consists of a lower outer cushion portion extending along the circumference and inflating at the time of deployment to be communicatively connected to the upper outer cushion portion and a lower dead portion forming an inner surface of the lower outer cushion portion without inflating.

4. The roof airbag apparatus for a vehicle of claim 3, wherein the cushion is provided with a center cushion portion extending to horizontally cross the bending point of the upper support portion and the lower support portion to be communicatively connected to the upper outer cushion portion and the lower outer cushion portion.

5. The roof airbag apparatus for a vehicle of claim 4, wherein a diameter of a portion of the center cushion portion connected to the upper outer cushion portion and the lower outer cushion portion is smaller than the diameter of the upper outer cushion portion and the lower outer cushion portion.

6. The roof airbag apparatus for a vehicle of claim 4, wherein the lower support portion is provided with a support cushion portion extending from the center cushion portion to vertically cross the lower dead portion to be communicatively connected to the lower outer cushion portion.

7. The roof airbag apparatus for a vehicle of claim 3, wherein a diameter of the bending point of the upper support portion and the lower support portion is smaller than the diameter of the upper outer cushion portion and the lower outer cushion portion in the cushion.

8. The roof airbag apparatus for a vehicle of claim 1, wherein the tether has one end connected to an upper end of the upper support portion and another end connected to a lower end of the lower support portion and extends shorter than a length of the airbag in an up or down direction.

9. The roof airbag apparatus for a vehicle of claim 1, wherein the tether extends in a width direction of the upper support portion and the lower support portion to have an area covering a part or a whole of the cushion.

10. The roof airbag apparatus for a vehicle of claim 1, wherein the cushion is provided with an auxiliary tether that has one end connected to an upper end of the upper support portion and another end connected to a lower of the lower support portion and that is formed shorter than a length of the tether.

* * * * *